May 20, 1958
E. E. SIVACEK
2,835,192
AUTOMATIC TOASTER
Filed Jan. 7, 1955
4 Sheets-Sheet 1
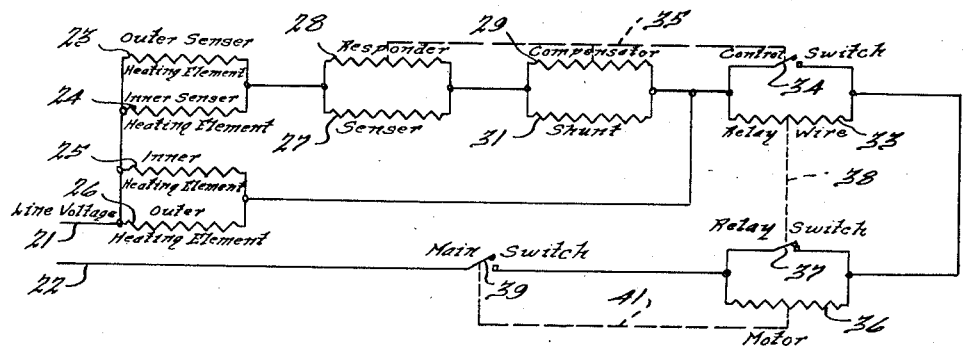
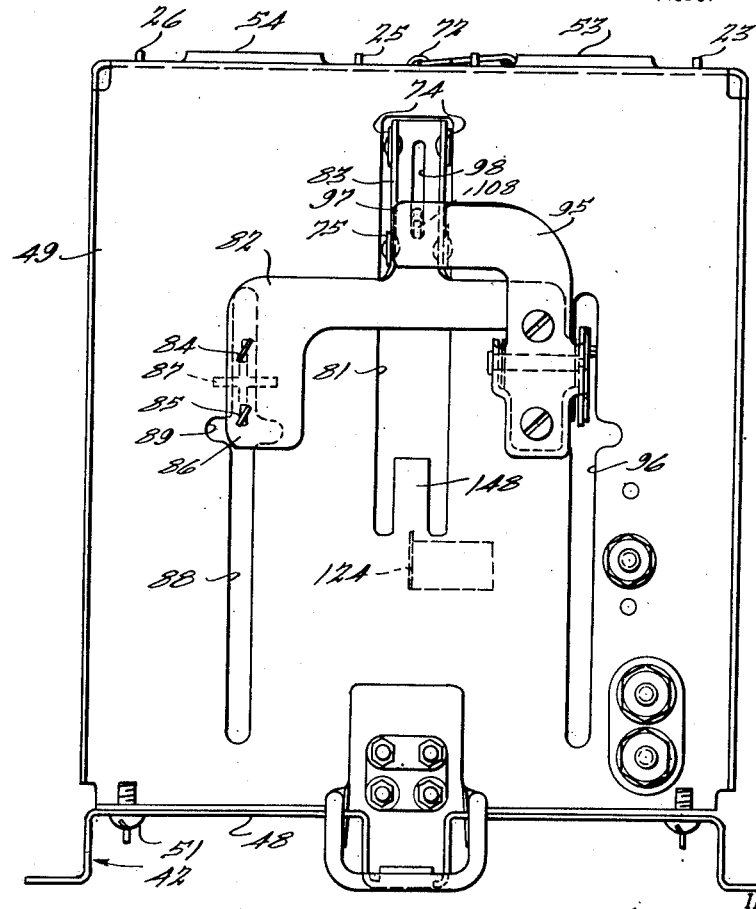
INVENTOR.
Emil E. Sivacek
BY
Harness, Dickey & Pierce
ATTORNEYS

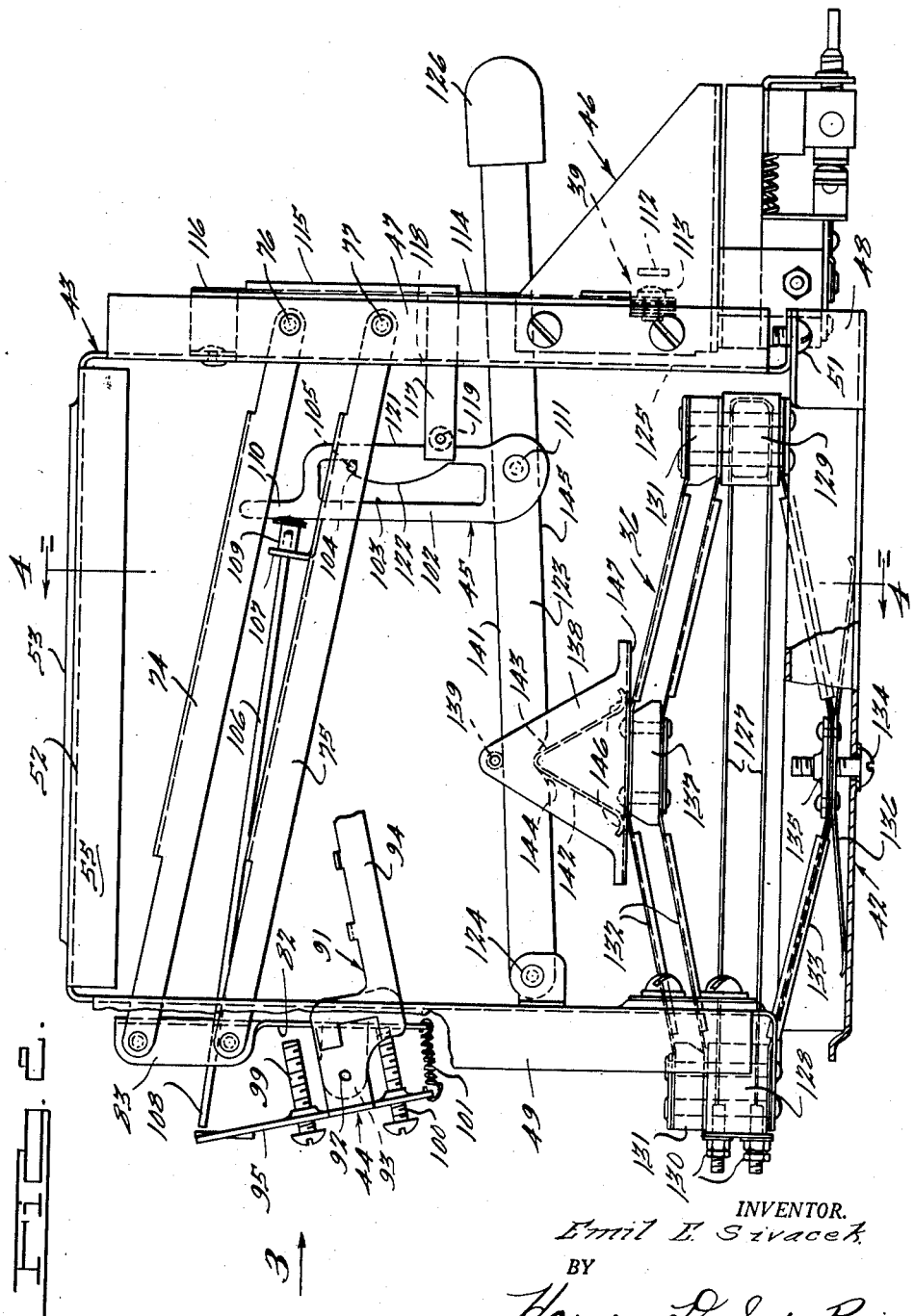

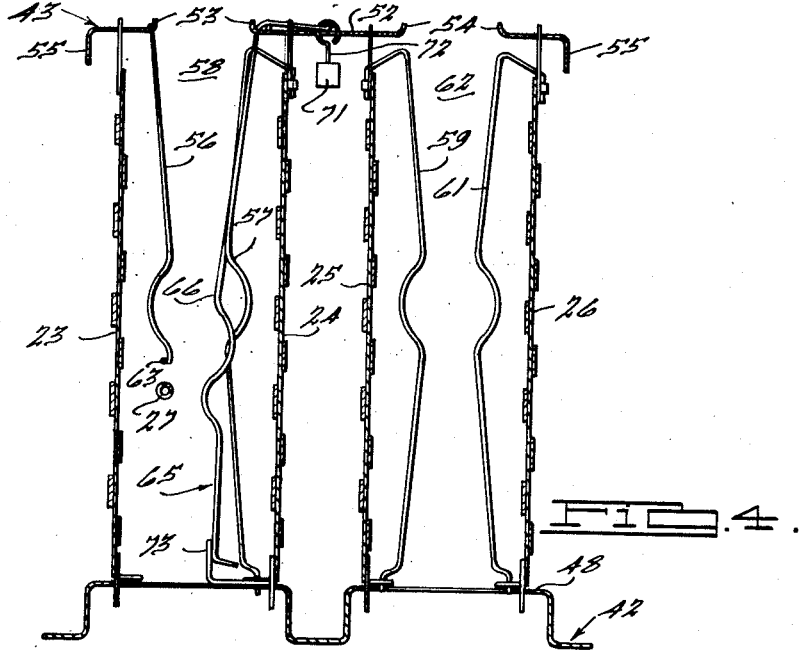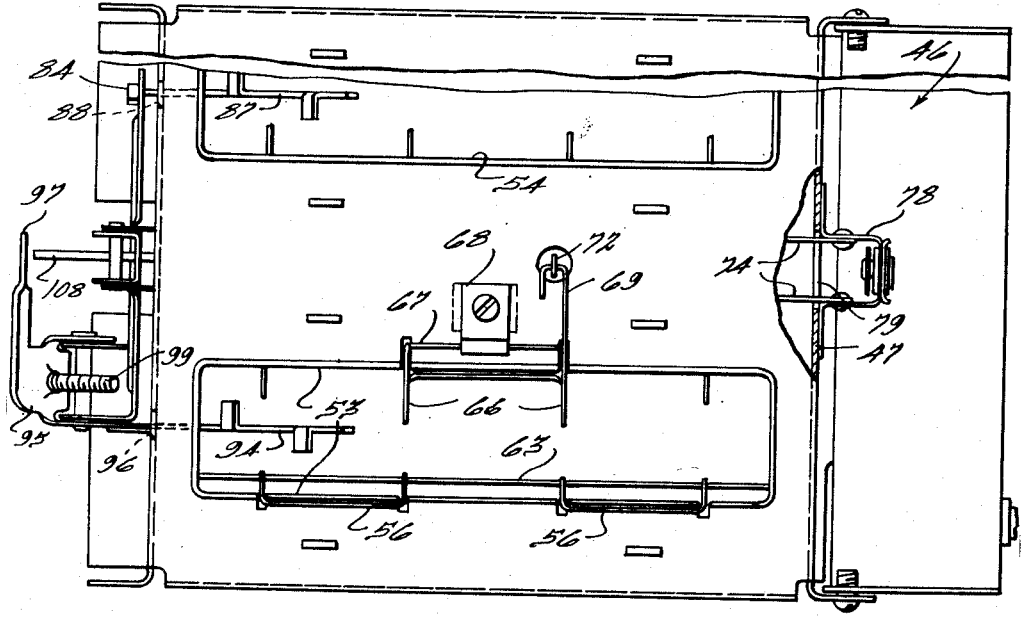

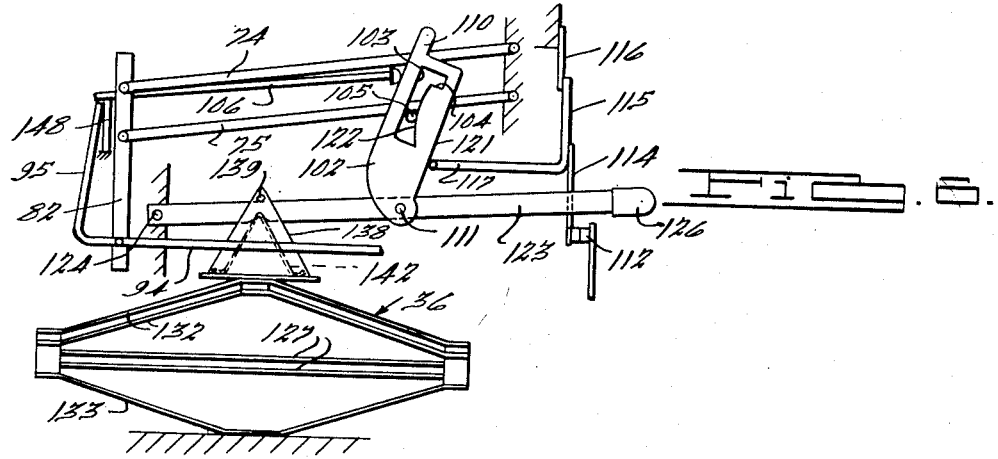
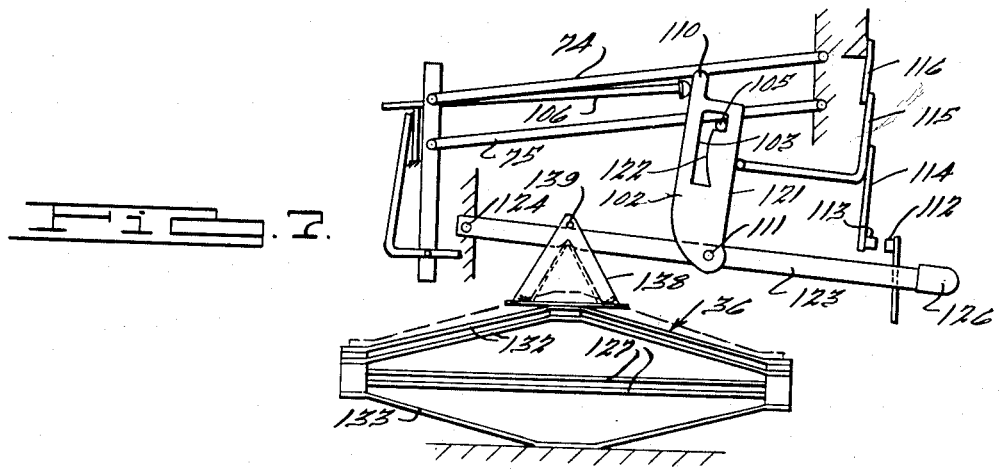
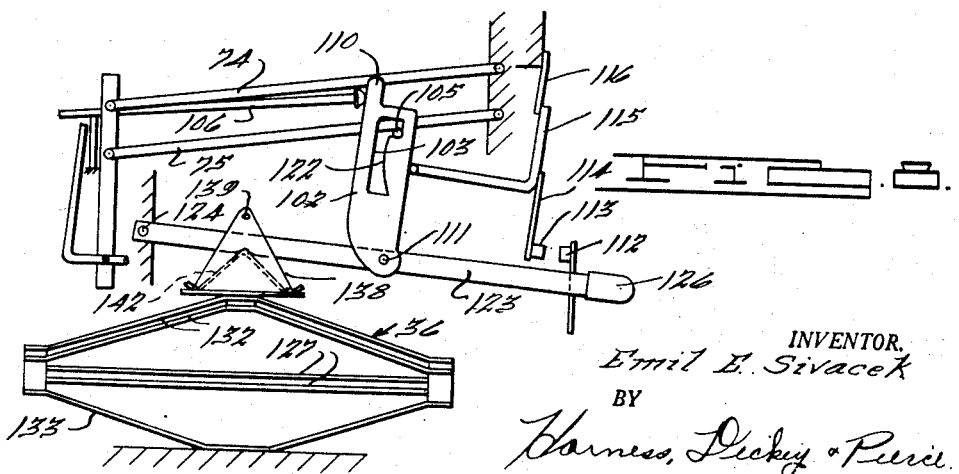
INVENTOR.
Emil E. Sivacek
BY
Harness, Dickey & Pierce
ATTORNEYS

United States Patent Office 2,835,192
Patented May 20, 1958

2,835,192

AUTOMATIC TOASTER

Emil E. Sivacek, Ann Arbor, Mich., assignor to King-Seeley Corporation, Ann Arbor, Mich., a corporation of Michigan Application January 7, 1955, Serial No. 480,398

29 Claims. (Cl. 99—329)

This invention relates to toasting mechanisms, and more particularly to so-called "pop-up" types of toasters, that is, toasters in which bread slices are inserted in the top of the mechanism, moved downwardly to toasting position, and are lifted at the end of the toasting operation.

It is an object of the present invention to provide a novel and improved type of automatic toaster in which the bread carriage is moved to toasting position by the force of gravity and is moved to non-toasting position by motor means.

It is also an object to provide an improved toaster of the above nature in which the motor is deenergized throughout the major portion of the toasting cycle and is only energized for a relatively short interval in order to lift the bread carriage.

It is a further object to provide an improved toaster having the above characteristics, in which no manual effort, other than dropping the toast into the toasting chambers, is required to initiate the complete toasting operation.

It is another object to provide an improved toaster of the above nature, in which the bread carriage is dropped into toasting position in response to the placing of a bread slice on the carriage, the carriage being lifted automatically into non-toasting position at the end of the toasting cycle.

It is another object to provide an improved toaster of the above character which utilizes a thermal motor remote from the toasting chambers of the toaster and separate from the heating elements, eliminating the need for high temperatures in the thermal motor elements and enabling these elements to be stressed at all times, thus enhancing the power and efficiency of the device.

It is a further object to provide an improved toaster of the above character in which the carriage lifting mechanism is armed and the toaster circuit opened in response to heating of the thermal motor, the bread carriage being lifted in response to cooling of the motor, the arrangement thus combining its functions in a manner which results in an economy of parts and full utilization of the working elements.

It is also an object to provide an improved toaster having the above characteristics which includes means for preventing damage to the thermal motor during cooling should an obstruction prevent the bread carriage from being lifted.

It is a further object to provide an improved toaster of the above nature which is especially adapted for use with a toasting interval controller having an element sensitive to bread surface radiation, and in which means are provided for positioning a bread slice with respect to this sensing element.

It is another object to provide an improved toaster of the above nature in which means are provided for preventing the accidental recycling of the device, and in which the toasted slice must be removed before the device is ready to start a new toasting cycle.

It is also an object to provide an improved toaster of the above nature in which manual means may be provided for terminating the toasting cycle prematurely, this means causing the thermal motor to lift the toast in the same manner as with automatic operation.

Other objects, features, and advantages of the present invention will become apparent from the subsequent description, taken in conjunction with the accompanying drawings.

In the drawings:

Figure 1 is a schematic circuit diagram of a toaster circuit which may be used in conjunction with the automatic toaster mechanism of this invention, showing the interval control elements as well as the thermal motor and toaster heaters;

Figure 2 is a side elevational view of the chassis of an automatic toaster of this invention, the parts being shown with the bread carriage in its non-toasting position, parts being omitted and broken away for clarity;

Figure 3 is an end elevational view in the direction of the arrow 3 of Figure 2, showing the mounting of the pusher plate on the bread carriage;

Figure 4 is a cross-sectional view taken along the line 4—4 of Figure 2, parts being omitted, showing the bread positioner and the relation of the senser to the toasting chambers;

Figure 5 is a fragmentary top plan view showing the relation of the pusher plate to the slidable rod and the mounting of the bread positioner;

Figure 6 is a schematic view similar to Figure 2, showing the toaster with the carriage in toasting position and the main switch closed;

Figure 7 is a view similar to Figure 6 but with the thermal motor heated, the carriage lifting mechanism armed and the main switch opened; and Figure 8 is a view similar to Figures 6 and 7 but showing the resulting positions of the bread carriage and thermal motor if the thermal motor cools while the bread carriage is obstructed from movement to its non-toasting position, this figure also illustrating the relative positions of the parts when the manual release handle is depressed.

The automatic toaster of this invention is adapted for use with a toasting interval controller, this controller imparting a signal which initiates action of a thermal motor at the end of the toasting interval to raise the bread carriage. The carriage is movable between an upper non-toasting position and a lower toasting position. In its upper position the bread carriage is supported, in the illustrated embodiment, by a member which has a supporting shoulder engageable with a portion of the bread carriage. This supporting member, also referred to as a cam, is movable between an upper supporting position, an upper non-supporting position, a lower non-supporting position, and a lower supporting position with respect to the bread carriage. A bread acceptor is mounted on the bread carriage and is movable in response to the weight of a slice of bread inserted in one of the toasting chambers. A slidable rod carried by the bread carriage is actuated in response to movement of the bread acceptor from its unloaded to its loaded position to move the cam from its upper supporting position to its upper non-supporting position. This allows the bread carriage to drop by the force of gravity into its toasting position. Movement of the cam to its upper non-supporting position also serves to close a switch in the toaster supply circuit. This circuit supplies current not only to the toaster heating elements but to the interval controller and to the thermal motor, although the latter is deenergized throughout the major portion of the toasting cycle.

When the toasting interval is completed, the thermal motor is energized in response to a signal from the interval controller. This thermal motor preferably comprises one or more wires having a predetermined temperature coefficient of expansion, and a spring or springs which urge the wire into taut condition. A movable portion of the spring is connected to the cam in such manner that when the spring is permitted to expand by elongation of the wire, the cam will be moved downwardly through a positive one-way driving connection from its upper non-supporting position to its lower non-supporting position. When it reaches the latter position, the cam will be urged into its lower supporting position with respect to the bread carriage by means of a spring which also serves to open the switch. This will cause deenergization of the thermal motor as well as the heating elements and interval controller. The subsequent contraction of the wire will cause movement of the spring in the opposite direction. The force of the contracting wire is transmitted by a yieldable one-way driving connection to the cam so that the latter is lifted into its upper supporting position, carrying with it the bread carriage. The time taken for the thermal motor to expand and contract is small compared with the entire toasting interval, and the toast is thus ejected without appreciable delay when the interval is terminated.

Means are provided for preventing recycling of the unit before the toast has been removed. This means comprises a projection on the toaster frame which disengages the slidable rod from the movable bread acceptor when the bread carriage reaches its lower or toasting position. This prevents reactuation of the cam to its non-supporting position until such time as the bread acceptor has been moved into its unloaded position by removal of the toast slice, allowing the rod to drop back into operative position. Means are also provided for preventing overstressing of the thermal motor wire should a stuck toast slice or other obstruction prevent upward movement of the bread carriage. This means includes the yieldable one-way driving connection mentioned above, which will permit full contraction of the motor wire even if the bread carriage is held in its lower position. This yieldable connection also serves to permit manual termination of the toasting cycle. A lever is provided for depressing the cam into its lower position independently of energization of the thermal motor, this lever acting against the yieldable one-way driving connection. When the cam shoulder snaps into supporting position with respect to the bread carriage, the manual lever may be released so that the spring which is included in the yieldable driving connection will lift the bread carriage into its non-toasting position, the main switch being opened in the same manner as previously described.

The toaster circuit shown in Figure 1 has the same basic arrangement as that shown in copending application Serial No. 317,220 of Emil E. Sivacek filed October 28, 1952, now Patent Number 2,750,873, dated June 19, 1956, and Serial Nos. 466,173 and 475,998 of Rudolph Bergsma filed November 1, 1954 and December 17, 1954, respectively, all applications being assigned to the present assignee. The circuit comprises a pair of supply leads 21 and 22 and a plurality of parallel heating elements 23, 24, 25 and 26. The toaster is arranged to toast two slices of bread simultaneously, with heating elements 23 and 26 being the outer heating elements of the two chambers and elements 24 and 25 being the inner heating elements. A senser 27 and a responder 28 are connected in series with heating elements 23 and 24 and in parallel with each other. Also in series with heating elements 23 and 24 and with elements 27 and 28 are a compensator 29 and a shunt 31, these last two elements being in parallel with each other. Heating elements 25 and 26 are connected by a lead 32 to the other side of compensator 29 and shunt 31.

In series with the above-mentioned elements is a relay wire 33 which is controlled by a shunt switch 34. Switch 34 is normally open but is closed at the beginning of a toasting cycle and is opened at the termination of the cycle to cause current to flow through relay wire 33. The position of switch 34 is controlled by a mechanical connection schematically shown at 35 in Figure 1 to the responder and compensator.

Also in series with the previously mentioned elements is a thermal motor 36 which serves to terminate the toasting cycle. This motor has a shunt switch 37 the position of which is controlled by a mechanical connection 38 from relay wire 33. The circuit is also provided with a main switch 39 in series with supply lead 22, and a mechanical connection schematically indicated at 41 exists between motor 36 and switch 39.

In reviewing the operation of the toaster circuit thus far described, it should be kept in mind that the functions of senser 27 and responder 28 are more completely described in Serial No. 317,220. The interval control including responder 28, compensator 29 and connection 35 is discussed in Serial No. 466,173, and details of thermal motor 36 and its associated parts are set forth in Serial No. 475,998. When the toaster is at rest before initiation of a toasting cycle, main switch 39 is open, as is control switch 34. Relay switch 37 is closed. Upon insertion of one or two slices of bread, main switch 39 is closed. The particular manner in which this switch is closed in the present embodiment is described in detail below. Heating elements 23—26 are energized, and connection 35 between the responder and compensator and control switch 34 causes immediate closing of this control switch. Relay wire 33 is thus shunted and remains deenergized, so that relay switch 37 remains closed, shunting motor 36. As the color of the bread surface becomes darker, senser 27 increases its resistance due to its temperature rise, causing a corresponding increase in the current passing through responder 28. The arrangement of the control mechanism, and particularly the connection between the responder 28, compensator 29, and control switch 34, is such that when the proper toast color is reached switch 34 will open. The subsequent current passing through relay wire 33 will cause this wire to expand, opening relay switch 37 through mechanical connection 38. When switch 37 is opened thermal motor 36 will be energized, causing opening of main switch 39 through connection 41 and termination of the toasting cycle. It will be understood that interval controls other than that shown in Figure 1 could be used within the principles of the invention, and that the invention could also be carried out without the intermediate relay arrangement shown in Figure 1.

Figures 2-5 illustrate a suitable construction of the automatic toaster of this invention. The mechanism comprises a base generally indicated at 42 and a frame generally indicated at 43 of inverted U-shape. Carried by frame 43 is a bread carriage generally indicated at 44 and the plurality of heating elements 23, 24, 25 and 26, shown in Figure 4. A carriage lifting mechanism generally indicated at 45 is also supported by frame 43, and base 42 supports the thermal motor generally indicated at 36. The toasting interval controller generally indicated at 46 is carried by one of the uprights 47 of frame 43. This controller may be of the type described in Serial No. 466,173 and includes the control elements described above with respect to Figure 1.

Base 42 is of generally flat shape and is provided with a pair of upstanding portions 48 to which uprights 47 and 49 of frame 43 are secured by bolts 51. Uprights 47 and 49 comprise vertical plates having flanges along their side edges. The intermediate portion 52 of frame 43 has a pair of flanged slots 53 and 54 as shown in Figure 4 for the reception of bread slices, and downturned side flanges 55. Heaters 23—26 are supported between base 42 and portion 52 of frame 43, as shown in Figure 4. Guard wires 56 and 57 are provided in left-hand chamber 58 of the toaster as shown in Figure 4, while guard wires 59 and 61 are provided in right-hand chamber 62. Of these, guard wires 57, 59 and 61 are carried by heating units 24, 25 and 26 respectively. The upper ends of guard wires 56 are secured to portion 52 of frame 43 as shown in Figures 4 and 5, while the lower ends of these guards are supported by a transverse supporting wire 63.

Senser 27 is positioned adjacent chamber 58 as shown in Figure 4. A bread positioner generally indicated at 65 is disposed adjacent chamber 58 opposite senser 27. The purpose of this bread positioner is to urge a bread slice against senser 27 when the bread is in toasting position, so that the senser may function more efficiently in controlling the toasting interval. The bread positioner comprises a wire bent into a pair of parallel bread engaging portions 66 and a transverse intermediate portion 67. A bracket 68 secured to portion 52 of frame 43 pivotally supports wire portion 67, as shown in Figure 5. An inward extension 69 on wire portion 67 is disposed over a clearance aperture 70 in frame portion 43 and carries a weight 71 by means of a hook 72 which biases positioner 65 clockwise in Figure 4. A stop 73 is secured to base 42 at the bottom of chamber 58, this stop serving to limit the movement of bread positioner 65 toward senser 27. The disposition of the parts is preferably such that a bread slice of normal thickness will swing bread positioner 65 counterclockwise as seen in Figure 4 when the bread slice moves downwardly within chamber 58. Weight 71 is sufficiently heavy to hold this bread slice against senser 27 so that the senser may be readily influenced by its surface color and temperature. It will be noted that bread positioner 65 does not interfere in any way with the function of guard wires 56, 57, 59 and 61 or with the remaining portions of the device.

Bread carriage 44 comprises a pair of parallel links 74 and 75 which are pivoted at 76 and 77 respectively to upright 47. In particular, these links comprise channel-shaped members at their intermediate portions and parallel flanges at their end portions, and are secured to the sides of a bracket 78 on upright 47 as seen in Figure 5. A clearance slot 79 is provided in upright 47 for the pivoted ends of links 74 and 75. The opposite ends of these links project through a clearance slot 81 in upright 49 as seen in Figure 3. A carriage plate 82 is secured to the ends of links 74 and 75 which extend through slot 81. This plate has an upper portion 83 to which links 74 and 75 are pivotally connected, the spacing between these pivotal connections being the same as that between pivots 76 and 77. Links 74 and 75 are thus mounted for movement in parallel. Plate 82 is vertically mounted and retains its vertical position throughout the range of movement of the carriage.

Carriage plate 82 serves to hold the bread supports for chambers 58 and 62 as well as the tripping mechanism for the bread carriage. The bread support for chamber 62 has a pair of lugs 84 and 85 which are secured to a portion 86 of plate 82. This bread support, which is shown in dotted lines at 87 in Figure 3, projects into chamber 62 through a clearance slot 88 in upright 49. Slot 88 is provided with an enlarged portion 89 for assembly of support 87 in the toaster.

The bread support for chamber 58 is part of what is termed the bread acceptor, generally indicated at 91 and pivotally supported at 92 by a lug 93 on carriage plate 82. Bread acceptor 91 is composed basically of two portions, a bread support portion 94 and a pusher plate portion 95. Bread support 94 projects through a clearance slot 96 into chamber 58, while pusher plate 95 is disposed outwardly of carriage plate 82 and curves upwardly and toward the central axis of the toaster as seen in Figure 3, so as to have its end 97 disposed in front of a vertical slot 98 in carriage plate extension 83. Bread acceptor 91 is provided with a pair of stops 99 and 100 which limit its swinging movement about pivot 92. A coil spring 101 is connected between the lower ends of pusher plate 95 and carriage plate 82, as seen in Figure 2. This spring urges bread acceptor 91 into its unloaded position shown in Figure 3, in which bread support 94 is in inclined position. When a bread slice is placed on bread support 94, spring 101 is stretched by the weight of the bread slice until stop 99 engages carriage plate 82, bread support 94 then being in a horizontal position as shown in Figures 7 and 8. Stops 99 and 100 are preferably adjustable to vary the limiting positions of bread acceptor 91 in accordance with requirements.

The means for supporting bread carriage 44 in its non-toasting position comprises a cam 102 which is part of carriage lifting mechanism 45. This cam has a central opening 103, a part of which is formed as a shoulder 104, seen in Figure 2. A pin 105 is secured to link 75 in such position that when cam 102 is in the position shown in Figure 2, pin 105 will rest on shoulder 104, the bread carriage being thus held in non-toasting position. The means for releasing bread carriage 44 so that it may drop into toasting position comprises a rod 106 which is slidably supported by a bearing 107 on link 75 and extends through slot 98 in carriage plate extension 83. End 108 of rod 106 is disposed in the path of pusher plate 95 so that when the pusher plate is swung clockwise in Figure 2 rod 106 will be urged to the right. The rod has a button 109 engageable with an extension 110 on cam 102 to urge the cam clockwise around its pivot support 111. Pin 105 will thus lose the support of shoulder 104 and bread carriage 44 will drop into its toasting position as shown in Figure 7.

Means are provided for closing main switch 39, shown in Figure 2, as the bread carriage drops into its toasting position. Main switch 39 comprises a fixed contact 112 and a movable contact 113. The movable contact is carried by a leaf spring 114 which is secured to a bar 115, this bar being in turn secured by a leaf spring 116 to upright 47. A follower arm 117 extends through a clearance slot 118 in upright 47 and carries a pin 119 engageable with an edge 121 of cam 102. Opening 103 of cam 102 has a cam surface 122 along which pin 105 rides when bread carriage 44 drops to its toasting position. When rod 106 moves to the right, follower arm 117 will be urged to the right due to the swinging of cam 102, thus closing switch 39. The shape of cam surface 122 is such that as pin 105 rides downwardly along this cam, cam 102 will be swung further clockwise, thus causing firmer engagement of contacts 112 and 113 and deflection of springs 114 and 116.

As indicated previously, bread lifting mechanism 45 and thermal motor 36 cooperate to lift bread carriage 44 into non-toasting position at the end of the toasting cycle. For this purpose, cam 102 is pivotally supported at 111 by a lever 123. One end of this lever is pivotally secured at 124 to upright 49, and the opposite end of the lever extends through a slot 125 in upright 47 and is provided with a handle 126. Lever 123 is movable between an upper position shown in Figures 2 and 6 and a lower position shown in Figures 7 and 8. When in its upper position lever 123 supports cam 102 in such a manner that bread carriage 44 is held in non-toasting position when pin 105 rests on shoulder 104. The lower position of lever 123 is so chosen that when the lever reaches this position shoulder 104 passes under pin 105 with the bread carriage in toasting position. Because of the urging of springs 114 and 116, follower arm 117 will cause counterclockwise rotation of cam 102 so that shoulder 104 will snap under pin 105, this action serving to open main switch 39. When lever 123 moves from its lower to its upper position carrying pin 105, it will lift bread carriage 44 to its non-toasting position.

The means for normally moving lever 123 from its lower to its upper position comprises thermal motor 36. In the illustrated embodiment, this motor includes a plurality of wires 127 which are secured in parallel relation between a pair of insulative blocks 128 and 129. The latter are positioned in the lower part of the toaster, appropriate clearance being provided in frame 43. Wires 127 are looped around block 129 and have terminals 130 secured to block 128 for connection to the supply circuit. Blocks 128 and 129 are surmounted by smaller insulative blocks 131, and a pair of upper yoke-shaped springs 132 are secured at their opposite ends to blocks 131 and urge blocks 128 and 129 away from each other, blocks 131 holding springs 132 in spaced relation. A lower yoke-shaped spring 133 is likewise secured between blocks 128 and 129 so that wires 127 are continually urged into taut condition. A mounting screw 134 passes through base 42 and is threadably mounted in a nut 135 carried by the central portion of spring 133. This mounting screw serves to support thermal motor 36. The mounting is adjustable by turning screw 134 to move the entire motor toward or away from base 42. A leaf spring 136 is disposed between base 42 and the central portion of spring 133, this leaf spring acting as the yieldable support for thermal motor 36.

The central portions of upper yoke-shaped springs 132 are secured together by an insulative block 137 so that the springs are in parallel relation. Surmounting block 137 is a bracket 138 which serves to connect thermal motor 36 with lever 123. In particular, bracket 138 carries a pin 139 at its upper end, this pin engaging the upper edge 141 of lever 123. Downward movement of bracket 138 will thus cause lever 123 to move downwardly, this driving connection being a positive one. A yieldable driving connection is also afforded between thermal motor 36 and lever 123 in the opposite direction, that is in the direction of lifting lever 123. In the illustrated embodiment, this yieldable driving connection comprises a leaf spring 142 of inverted V-shape carried by bracket 138. The upper end 143 of this spring is disposed in a notch 144 in the lower edge 145 of lever 123. The lower ends 146 of spring 142 are supported by a platform 147 on the lower end of bracket 138. It will thus be seen that if lever 123 is depressed from its upper position shown in Figure 2 while bracket 138 remains stationary, spring 142 will be flattened, ends 146 thereof sliding outwardly on platform 147 and permitting lever 123 and its attendant parts to be lowered. Similarly, should an obstruction prevent lever 123 from moving upwardly from its lower position (for example, if a slice of bread is stuck in toasting position) bracket 138 can move upwardly by the compression of spring 142.

The downward movement of bracket 138 will be caused by heating of wires 127 which have a predetermined temperature coefficient of expansion. Upon such heating, blocks 128 and 129 will be allowed to separate, permitting springs 132 and 133 to expand and flatten, with their central portions approaching each other in a vertical direction. Since lower spring 133 is fixed to base 42, the central portions of upper springs 132 will be lowered, carrying bracket 138 with them. Likewise, when wires 127 are deenergized, their contraction will cause springs 132 and 133 to spread apart, lifting bracket 138. The lower position of bracket 138, that is when wires 137 are heated, can be adjusted by turning mounting screw 134.

Means are provided for preventing accidental recycling of the device and insuring that the toasted slice is removed before a new cycle takes place. This means comprises a tripping projection 148 at the lower end of slot 81 in upright 49. This projection is aligned with end 108 of rod 106, the latter projecting through slot 98 in carriage plate 82. Normally, rod end 108 rests at the bottom of slot 98. As bread carriage 44 reaches its toasting position, arm 108 will engage projection 148, so that the remainder of bread carriage 44 continues to drop while rod end 108 remains relatively stationary. This will lift end 108 above pusher plate 95 which can then move under rod end 108. This position is shown in Figure 6, and it will be seen that when main switch 39 is opened and the bread carriage lifted, the main switch cannot again be closed until rod 106 moves to the right. This is impossible until pusher plate 95 is swung in back of rod end 108 so that the rod end may drop into alignment with the pusher plate. This requires that the slice of toast resting on support 94 be removed so that spring 101 may swing pusher plate 95 counterclockwise. An effective means is thus provided for preventing accidental recycling of the toaster.

*Operation*

Assuming an initial condition in which the toaster is deenergized and bread carriage 44 is in its non-toasting position, the parts will appear as in Figure 2. Upon insertion of a slice of bread in chamber 58, the broad slice will engage support 94 and swing pusher plate 95 clockwise against spring 101 until stop 99 engages carriage plate 82. Rod 106 will be moved to the right, swinging cam 102 clockwise from its upper supporting position to its upper non-supporting position and closing switch 39 through follower arm 117. Shoulder 104 will be removed from its supporting position with respect to pin 105, and parallel links 74 and 75 will drop together with bread support 87 and acceptor 91. As the bread carriage drops, pin 105 will ride along cam surface 122 urging contact 113 against contact 112. As bread carriage 44 approaches its toasting position, as determined by the engagement of link 75 with the bottom of slot 81, rod end 108 will engage projection 148 lifting the rod end from alignment with pusher plate 95 and permitting the pusher plate to move thereunder, as shown in Figure 6. Lever 123 and thermal motor 36 will remain in their starting positions, the thermal motor being shunted and thus deenergized.

When the toasting interval has been completed as described above with respect to Figure 1, wires 127 will be energized and bracket 138 will be drawn downwardly by expansion of springs 132 and 133. This will cause downward swinging movement of lever 123 until cam 102 reaches its lower non-supporting position with shoulder 104 at the level of pin 105. Springs 114 and 116 will then move cam 102 to its lower supporting position in which shoulder 104 snaps under pin 105, as shown in Figure 7. This will cause opening of switch 39 and deenergization of the heating elements and motor wires 127. The wires will cool, lifting bracket 138 and arm 123 together with bread carriage 44. The arrangement is such that when wires 127 reach their normal temperature bread carriage 44 will be in its non-toasting position so that the toast slices can be removed. Upon removal of the bread slice on support 94 pusher plate 95 will be swung counterclockwise by spring 101, rearming the carriage tripping mechanism by permitting rod end 108 to drop into alignment with pusher plate 95. Bread support 94 will also be moved into its inclined position shown in Figure 2 so that another slice of bread may be accepted.

Should the bread carriage and lever 123 be prevented from moving upwardly upon cooling of motor wires 127 due to an obstruction such as a stuck bread slice, spring 142 will be compressed and thus prevent any damage to thermal motor 36 due to cooling of wires 127. This position is shown in Figure 8, in which thermal motor 36 is shown in its cool position with the bread carriage still in its toasting position and cam 102 in its lower supporting position. Bracket 138 has been lifted and spring 142 flattened because of its engagement with the underside of arm 123, pin 139 moving away from the upper edge of this arm. Upon removal of the obstruction, spring 142 will resume its original shape, lifting arm 123 and the bread carriage to its non-toasting position.

If the operator decides to terminate the toasting cycle prematurely, he presses downwardly on handle 126. This will draw cam 102 downwardly, spring 142 being compressed during this action. Shoulder 104 will snap under pin 105 in the usual manner, opening main switch 39 to disconnect the toaster heaters. Handle 126 may then be released and the contraction of spring 142 will lift lever 123 together with bread carriage 44. It will be noted that thermal motor 36 will not be energized during this operation.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims. The term "signal" as used in the claims is intended to refer to an effect, including the opening or closing of a switch, produced by a controller which is condition-responsive, time-responsive or both.

What is claimed is:

1. In a toaster, a toasting chamber, a bread carriage movable between an upper non-toasting position and a lower toasting position with respect to said toasting chamber, means for supporting said bread carriage in its non-toasting position, means for disengaging said supporting means from said bread carriage to permit the bread carriage to drop into its toasting position, a toasting interval controller, a thermal motor remote from said toasting chamber, means responsive to a signal from said controller for energizing said motor, means responsive to energization of said motor for causing re-engagement of said supporting means with said bread carriage, means responsive to said re-engagement for deenergizing said motor, and means responsive to deenergization of said motor for lifting said bread carriage into non-toasting position.

2. In a toaster, a heating element, a bread carriage movable with respect to said heating element between an upper non-toasting position and a lower toasting position, means for supporting said bread carriage in its non-toasting position, means for disconnecting said supporting means from said bread carriage to permit the bread carriage to drop into toasting position, a thermal motor separate from said heating element, means connecting said thermal motor to said bread carriage supporting means, said thermal motor being normally deenergized, means for reconnecting said supporting means and said bread carriage in response to energization of said thermal motor, and means responsive to cooling of said thermal motor for lifting said supporting means and said bread carriage into non-toasting position.

3. In a toaster, a heating element, a supply circuit for said heating element, a bread carriage movable with respect to said heating element between an upper non-toasting position and a lower toasting position, means for disconnecting said supporting means from said bread carriage to permit the bread carriage to drop into toasting position, a thermal motor separate from said heating element, means connecting said thermal motor to said bread carriage supporting means, said thermal motor being normally deenergized, means for reconnecting said supporting means and said bread carriage and opening said supply circuit in response to energization of said thermal motor, and means responsive to cooling of said thermal motor for lifting said supporting means and said bread carriage into non-toasting position.

4. In a toaster, a heating element, a supply circuit for said heating element, a bread carriage movable with respect to said heating element between an upper non-toasting position and a lower toasting position, means for holding said bread carriage in its non-toasting position, means for releasing said holding means to allow said bread carriage to drop into its toasting position, means for closing said supply circuit when said holding means is released, a thermal motor connected to said holding means, said thermal motor being separate from said heating element and in said supply circuit, means for maintaining said thermal motor in normally deenergized condition, means for energizing said thermal motor at the end of a toasting interval, movement of said thermal motor upon being energized causing said holding means to be reconnected with said bread carriage while the latter is in its toasting position, and means for opening said supply circuit when said holding means is moved to its reconnected position, whereby subsequent cooling of said thermal motor will lift said bread carriage to its non-toasting position.

5. In a toaster, a heating element, a bread carriage movable between an upper non-toasting position and a toasting position with respect to said heating element, means for supporting said bread carriage in its non-toasting position, means responsive to placing of a slice of bread on said bread carriage for releasing said supporting means to allow said bread carriage to drop into its toasting position, a supply circuit for said heating element, means responsive to movement of said supporting means to its release position for closing said supply circuit, a thermal motor separate from said heating element and in said supply circuit, said thermal motor being normally deenergized, means for energizing said thermal motor at the end of a toasting interval, means responsive to heating of said thermal motor for reconnecting said supporting means with said bread carriage while the latter is in its toasting position and for simultaneously opening said supply circuit, and means responsive to subsequent cooling of said thermal motor for lifting said supporting means with said bread carriage into non-toasting position.

6. The combination according to claim 5, further provided with means for preventing further release of said bread carriage supporting means until said slice of bread is removed.

7. In a toaster, a heating element, a bread carriage movable vertically between an upper non-toasting position and a lower toasting position, means for supporting said bread carriage in its non-toasting position, a movable bread support on said bread carriage, a connection between said movable bread support and said supporting means, said connection being engageable with said supporting means in response to the placing of a slice of bread on said movable bread support to move said supporting means into released position permitting said bread carriage to drop into toasting position, a thermal motor separate from said heating element, means responsive to energization of said thermal motor to reconnect said supporting means and said bread carriage when the latter is in its toasting position, and means responsive to cooling of said thermal motor to lift said supporting means and said bread carriage into non-toasting position.

8. The combination according to claim 7, said movable bread support comprising a pivoted member movable between an inclined position and a horizontal loaded position, a pusher plate swingable with said bread support, and a rod engageable by said pusher plate and movable into engagement with said bread carriage supporting means.

9. In a toaster, a frame, a heating element supported by said frame, a pair of parallel links pivoted at one end to said frame, a bread acceptor movably supported by the other end of said parallel links, supporting means for holding said parallel links in an upper non-toasting position, means responsive to the placing of a slice of bread on said bread acceptor for releasing said supporting means to permit said parallel links and bread acceptor to drop into toasting position, a thermal motor connected to said supporting means, means responsive to energization of said thermal motor for causing said supporting means to be reconnected to said parallel links while in their toasting position, and means responsive to cooling of said thermal motor for lifting said parallel links and bread acceptor into non-toasting position.

10. The combination according to claim 9, said supporting means comprising a cam having a supporting shoulder thereon, a lever supporting said cam, means connecting said lever to said thermal motor whereby energization of said motor lowers said lever and cam and cooling of said motor lifts said lever and cam, and means on said parallel links releasably engageable by said cam shoulder.

11. In a toaster, a frame, a bread carriage mounted on said frame and movable between an upper non-toasting position and a lower toasting position, a supporting member, means on said bread carriage releasably engageable by said member to hold said bread carriage in its non-toasting position, means carrying said member for movement between an upper supporting position, an upper non-supporting position, a lower non-supporting position, and a lower supporting position with respect to said bread carriage, means responsive to insertion of a bread slice for moving said member from its upper supporting position to its upper non-supporting position, whereby said bread carriage is permitted to move to its toasting position, a toasting interval controller, means responsive to a signal from said controller for moving said member from its upper non-supporting position to its lower non-supporting position, means responsive to arrival of said member at its lower non-supporting position for moving said member into its lower supporting position, and means responsive to movement of said member to its lower supporting position for moving said member to its upper supporting position, whereby said bread carriage is lifted.

12. In a toaster, a frame, a bread carriage mounted on said frame and movable between an upper non-toasting position and a lower toasting position, a supporting member, means on said bread carriage releasably engageable by said member to hold said bread carriage in its non-toasting position, means carrying said member for movement between an upper supporting position, an upper non-supporting position, a lower non-supporting position, and a lower supporting position with respect to said bread carriage, means responsive to insertion of a bread slice for moving said member from its upper supporting position to its upper non-supporting position, whereby said bread carriage is permitted to move to its toasting position, a toasting interval controller, means responsive to movement of said member to its upper non-supporting position for actuating said controller, means responsive to a signal from said controller for moving said member from its upper non-supporting position to its lower non-supporting position, means responsive to arrival of said member at its lower non-supporting position for moving said member into its lower supporting position, and means responsive to movement of said member to its lower supporting position for moving said member to its upper supporting position, whereby said bread carriage is lifted.

13. In a toaster, a frame, a bread carriage mounted on said frame and movable between an upper non-toasting position and a lower toasting position, a supporting member, means on said bread carriage releasably engageable by said member to hold said bread carriage in its non-toasting position, means carrying said member for movement between an upper supporting position, an upper non-supporting position, a lower non-supporting position, and a lower supporting position with respect to said bread carriage, a bread acceptor movably mounted on said bread carriage, a rod movably mounted on said bread carriage and engageable by said bread acceptor, said rod being movable in response to insertion of a slice of bread to move said member from its upper supporting position to its upper non-supporting position, whereby said bread carriage is permitted to move to its toasting position, a toasting interval controller, means responsive to a signal from said controller for moving said member from its upper non-supporting position to its lower non-supporting position, means responsive to arrival of said member at its lower non-supporting position for moving said member into its lower supporting position, and means responsive to movement of said member to its lower supporting position for moving said member to its upper supporting position, whereby said bread carriage is lifted.

14. In a toaster, a frame, a heating element carried by said frame, a bread carriage mounted on said frame and movable between an upper non-toasting position and a lower toasting position with respect to said heating element, a supporting member, means on said bread carriage releasably engageable by said member to hold said bread carriage in its non-toasting position, means carrying said member for movement between an upper supporting position, an upper non-supporting position, a lower non-supporting position, and a lower supporting position with respect to said bread carriage, means responsive to insertion of a bread slice for moving said member from its upper supporting position to its upper non-supporting position, whereby said bread carriage is permitted to move to its toasting position, means responsive to movement of said member into its upper non-supporting position for energizing said heating elements, a toasting interval controller, means responsive to a signal from said controller for moving said member from its upper non-supporting position to its lower non-supporting position, means responsive to arrival of said member at its lower non-supporting position for moving said member into its lower supporting position and deenergizing said heating element, and means responsive to movement to said member to its lower supporting position for moving said member to its upper supporting position, whereby said bread carriage is lifted.

15. In a toaster, a frame, a bread carriage mounted on said frame and movable between an upper non-toasting position and a lower toasting position, a supporting member, means on said bread carriage releasably engageable by said member to hold said bread carriage in its non-toasting position, means carrying said member for movement between an upper supporting position, an upper non-supporting position, a lower non-supporting position, and a lower supporting position with respect to said bread carriage, means responsive to insertion of a bread slice for moving said member from its upper supporting position to its upper non-supporting position, whereby said bread carriage is permitted to move to its toasting position, a toasting interval controller, means responsive to movement of said member into its upper non-supporting position for energizing said heating element and actuating said controller, means responsive to a signal from said controller for moving said member from its upper non-supporting position to its lower non-supporting position, means responsive to arrival of said member at its lower non-supporting position for moving said member into its lower supporting position and deenergizing said heating element, and means responsive to movement of said member to its lower supporting position for moving said member to its upper supporting position, whereby said bread carriage is lifted.

16. In a toaster, a frame, a bread carriage mounted on said frame and movable between an upper non-toasting position and a lower toasting position, a supporting member, means on said bread carriage releasably engageable by said member to hold said bread carriage in its non-toasting position, means carrying said member for movement between an upper supporting position, an upper non-supporting position, a lower non-supporting position, and a lower supporting position, means responsive to insertion of a bread slice for moving said member from its upper supporting position to its upper non-supporting position, whereby said bread carriage is permitted to move to its toasting position, a toasting interval controller, a normally deenergized thermal motor connected to said member, said motor being energizable in response to a signal from said controller to move said member from its upper non-supporting position to its lower non-supporting position, means responsive to arrival of said member at its lower non-supporting position for moving said member into its lower supporting position and deenergizing said motor, and means responsive to deenergization of said motor for moving said member to its upper supporting position, whereby said bread carriage is lifted.

17. In a toaster, a frame, a bread carriage mounted on said frame and movable between an upper non-toasting position and a lower toasting position, a supporting member, means on said bread carriage releasably engageable by said member to hold said bread carriage in its non-toasting position, means for supporting said member for movement between an upper supporting position, an upper non-supporting position, a lower non-supporting position, and a lower supporting position, means responsive to insertion of a bread slice for moving said member from its upper supporting position to its upper non-supporting position, whereby said bread carriage is permitted to move to its toasting position, a toasting interval controller, a supply circuit for said heating element and said controller, a switch in said supply circuit, a spring urging said switch into normally open position, means responsive to movement of said member into its upper non-supporting position for closing said switch, means responsive to a signal from said controller for moving said member from its upper non-supporting position to its lower non-supporting position, said spring being responsive to arrival of said member at its lower non-supporting position to move said member into its lower supporting position, and means responsive to movement of said member to its lower supporting position for moving said member to its upper supporting position, whereby said bread carriage is lifted.

18. In a toaster, a frame, a bread carriage mounted on said frame and movable between an upper non-toasting position and a lower toasting position, a supporting member, means on said bread carriage releasably engageable by said member to hold said bread carriage in its non-toasting position, means for supporting said member for movement between an upper supporting position, an upper non-supporting position, a lower non-supporting position, and a lower supporting position, means responsive to insertion of a bread slice for moving said member from its upper supporting position to its upper non-supporting position, whereby said bread carriage is permitted to move to its toasting position, a toasting interval controller, a supply circuit for said heating element and said controller, a switch in said supply circuit, a spring normally urging said switch into normally open position, means responsive to movement of said member into its upper non-supporting position for closing said switch, and a normally deenergized thermal motor connected to said member, said motor being responsive to a signal from said controller to move said member from its upper non-supporting position to its lower non-supporting position, said spring being responsive to arrival of said member at its lower non-supporting position to move said member into its lower supporting position, said thermal motor being responsive to movement of said member to its lower supporting position for moving said member to its upper supporting position, whereby said bread carriage is lifted.

19. In a toaster, a frame, a bread carriage mounted on said frame and movable between an upper non-toasting position and a lower toasting position, a supporting member, means on said bread carriage releasably engageable by said member to hold said bread carriage in its non-toasting position, means for supporting said member for movement between an upper supporting position, an upper non-supporting position, a lower non-supporting position, and a lower supporting position, means responsive to insertion of a bread slice for moving said member between its upper supporting position and its upper non-supporting position, whereby said bread carriage is permitted to move to its toasting position, a toasting interval controller, a supply circuit for said heating element and said controller, a switch in said supply circuit, a spring urging said switch into normally open position, means responsive to movement of said member into its upper non-supporting position for closing said switch, and a normally deenergized thermal motor in said supply circuit and connected to said member, said motor being energizable in response to a signal from said controller to move said member from its upper non-supporting position to its lower non-supporting position, said spring being responsive to arrival of said member at its lower non-supporting position for moving said member into its lower supporting position, and opening said switch, cooling of said motor causing said member to move to its upper supporting position, whereby said bread carriage is lifted.

20. In a toaster, a frame, a bread carriage mounted on said frame and movable between an upper non-toasting position and a lower toasting position, a supporting member, means on said bread carriage releasably engageable by said member to hold said bread carriage in its non-toasting position, means for supporting said member for movement between an upper supporting position, an upper non-supporting position, a lower non-supporting position, and a lower supporting position, means responsive to insertion of a bread slice for moving said member from its upper supporting position to its upper non-supporting position, whereby said bread carriage is permitted to move to its toasting position, a toasting interval controller, a normally deenergized thermal motor connected to said controller, said motor being energizable in response to a signal from said controller, a positive one-way driving connection between said member and said thermal motor whereby said member is lowered in response to energization of the motor, means responsive to arrival of said member at its lower non-supporting position for moving said member into its lower supporting position and deenergizing said thermal motor, and a yieldable connection between said thermal motor and said member whereby cooling of said thermal motor causes movement of said member from its lower supporting position to its upper supporting position to lift said bread carriage.

21. The combination according to claim 20, said yieldable connection comprising a spring having one portion supporting said member and another portion supported by said thermal motor, and manual means for depressing said member and deflecting said spring independently of movement of said thermal motor.

22. The combination according to claim 21, further provided with means for mounting said thermal motor on said frame, said mounting means being adjustable to vary the height of said spring.

23. In a toaster, a frame, a bread carriage mounted on said frame and movable between an upper non-toasting position and a lower toasting position, a supporting member, means on said bread carriage releasably engageable by said member to hold said bread carriage in its non-toasting position, means for supporting said member for movement between an upper supporting position, an upper non-supporting position, a lower non-supporting position, and a lower supporting position, means responsive to insertion of a bread slice for moving said member from its upper supporting position to its upper non-supporting position, whereby said bread carriage is permitted to move to its toasting position, a toasting interval controller, means responsive to a signal from said controller for moving said member from its upper non-supporting position to its lower non-supporting position, manual means operable independently of said controller for moving said member from its upper non-supporting position to its lower non-supporting position, means responsive to arrival of said member at its lower non-supporting position for moving said member into its lower supporting position, and means responsive to movement of said member to its lower supporting position for moving said member to its upper supporting position, whereby said bread carriage is lifted.

24. In a toaster, a base, a frame mounted on said base, a heating element supported by said frame, a pair of parallel links pivoted at one end to said frame, a carriage plate pivoted to the opposite ends of said links and movable between an upper non-toasting position and a lower toasting position with respect to said heating element, a bread acceptor pivotally mounted on said carriage plate, said bread acceptor being movable between an unloaded position and a loaded position, a spring biasing said bread acceptor into its unloaded position, the bread acceptor being movable to its loaded position in response to the weight of a slice of bread, a pusher plate on said bread acceptor, a rod having one end adjacent said pusher plate, means on said carriage plate supporting said one end of the rod for sliding movement and for transverse movement between a lower position in alignment with said pusher plate and an upper position out of alignment with said pusher plate, means on said frame for moving said one end of the rod from its lower to its upper position in response to movement of said carriage plate from its upper to its lower position, a cam having a supporting shoulder thereon, an arm pivoted to said frame and pivotally supporting said cam, a pin on one of said links supportable by said shoulder, the other end of said rod being slidably supported by one of said links and engageable with said cam to move the cam about its pivot from a supporting position to a non-supporting position in response to slidable movement of said rod by said pusher plate, whereby said bread carriage is allowed to drop into toasting position, a toasting interval controller, a supply circuit for said controller and said heating element, a switch in said supply circuit, a spring urging said switch into open position, a follower bar connecting said switch and said cam whereby movement of said cam to its upper non-supporting position closes said switch, a surface on said cam engageable by said pin as said carriage plate moves to toasting position to hold said switch closed, a thermal motor mounted on said base and in said supply circuit, means for normally maintaining said thermal motor in deenergized condition, a wire in said thermal motor having a predetermined temperature coefficient of expansion, a spring tending to elongate said wire, expansion of said wire causing movement of a portion of said spring, a positive one-way driving connection between said spring portion and said arm, whereby expansion of said wire will cause lowering of said arm and said cam into a lower non-supporting position, means responsive to a signal from said controller for energizing said wire and causing it to expand, said switch spring being responsive to arrival of said cam in its lower non-supporting position to move said cam to a lower supporting position in which said shoulder is beneath said pin, said last-mentioned movement of said switch spring causing opening of said switch, deenergization of said heating element and cooling of said wire, and a resilient connection between said wire and said arm whereby said arm, cam and bread carriage will be yieldably lifted by cooling of said wire.

25. In a toaster, a toasting chamber, heating means in said chamber, a bread carriage movable between an upper non-toasting position and a lower toasting position with respect to said toasting chamber, means for supporting said bread carriage in its non-toasting position, said means being movable between a supporting position in engagement with said bread carriage and a non-supporting position out of engagement with said bread carriage, means responsive to the placing of a bread slice on said bread carriage for immediately moving said supporting means from its supporting to its non-supporting position, whereby said bread carriage is permitted to drop at once to its toasting position, a toasting interval controller adapted to produce a signal, a thermal motor remote from said toasting chamber and heating means and responsive to said signal for causing said supporting means to return to its supporting position, and means responsive to said return movement for causing said thermal motor to lift said bread carriage to its non-toasting position.

26. In a toaster, a toasting chamber, a bread carriage movable between an upper non-toasting position and a lower toasting position with respect to said toasting chamber, means for supporting said bread carriage in its non-toasting position, said means being movable between a supporting position in engagement with said bread carriage and a non-supporting position out of engagement with said bread carriage, means responsive to the placing of a bread slice on said bread carriage for immediately moving said supporting means from its supporting to its non-supporting position, whereby said bread carriage is permitted to drop at once to its toasting position, a toasting interval controller adapted to produce a signal, a thermal motor comprising an elongated electrically conductive member having a predetermined temperature coefficient of expansion, a spring connected to said member and subjecting said member to a tensile force to maintain the member in taut condition, means responsive to said signal for energizing said member, a portion on said spring movable in response to said member energization, and means connected to said spring portion and responsive to said movement for causing said supporting means to return to its supporting position and said bread carriage to be lifted to its non-toasting position.

27. In a toaster, a toasting chamber, a bread carriage movable between an upper non-toasting position and a lower toasting position with respect to said toasting chamber, means for supporting said bread carriage in its non-toasting position, said means being movable between a supporting position in engagement with said bread carriage and a non-supporting position out of engagement with said bread carriage, means for moving said supporting means from its supporting to its non-supporting position, whereby said bread carriage is permitted to drop at once to its toasting position, a toasting interval controller adapted to produce a signal, a normally de-energized thermal motor, said motor comprising an elongated electrically conductive member having a predetermined temperature coefficient of expansion, a spring connected to said member and subjecting said member to a tensile force to maintain the member in taut condition, means responsive to said signal for energizing said member, a portion on said spring movable in response to said member energization, and means connected to said spring portion and responsive to said movement for causing said bread carriage to be lifted to its non-toasting and supported position.

28. In a toaster, a toasting chamber, a heater for said toasting chamber, a main switch for said heater, a bread carriage movable between an upper non-toasting position and a lower toasting position with respect to said toasting chamber, a latch movable between a supporting position in engagement with said bread carriage and a non-supporting position out of engagement with said bread carriage, an operator-controlled member for moving said latch from its supporting to its non-supporting position, whereby said bread carriage is permitted to drop at once to its toasting position, a toasting interval controller adapted to produce a signal, means responsive to movement of said latch to its non-supporting position for closing said main switch and initiating action of said controller, a normally de-energized thermal motor comprising an elongated electrically conductive member having a predetermined temperature coefficient of expansion, a spring connected to said member and subjecting said member to a tensile force to maintain the member in taut condition, a switch responsive to said signal for energizing said member, a portion on said spring movable in response to said member energization, and means connected to said spring portion and responsive to said movement for causing said bread carriage to be lifted to its non-toasting and supported position and said main switch to open.

29. The combination according to claim 28, said last-mentioned means including a member responsive to said spring portion movement to cause re-engagement of said latch with said bread carriage when said bread carriage is in its toasting position, and a spring responsive to said re-engagement to cause opening of said main switch, whereby cooling of said conductive member will cause said bread carriage to be lifted to its non-toasting position.

References Cited in the file of this patent

UNITED STATES PATENTS

| | | | |
|---|---|---|---|
| 2,294,695 | Sardeson | Sept. 1, | 1942 |
| 2,347,385 | Wright et al. | Apr. 25, | 1944 |
| 2,347,611 | Purpura | Apr. 25, | 1944 |
| 2,515,866 | Fritzgerald | July 18, | 1950 |
| 2,644,392 | Foster | July 7, | 1953 |
| 2,655,860 | Smith | Oct. 20, | 1953 |
| 2,667,828 | Koci | Feb. 2, | 1954 |
| 2,734,448 | McCullough | Feb. 14, | 1956 |
| 2,750,874 | Ireland | June 19, | 1956 |

UNITED STATES PATENT OFFICE
CERTIFICATE OF CORRECTION

Patent No. 2,835,192                                                                May 20, 1958

Emil E. Sivacek

It is hereby certified that error appears in the printed specification of the above numbered patent requiring correction and that the said Letters Patent should read as corrected below.

Column 8, line 11, for "broad" read -- bread --; column 12, line 26, for "to", second occurrence, read -- of --.

Signed and sealed this 8th day of July 1958.

(SEAL)
Attest:

KARL H. AXLINE
Attesting Officer

ROBERT C. WATSON
                                                  Commissioner of Patents